United States Patent
Dong et al.

(10) Patent No.: US 10,360,267 B2
(45) Date of Patent: Jul. 23, 2019

(54) QUERY PLAN AND OPERATION-AWARE COMMUNICATION BUFFER MANAGEMENT

(71) Applicant: Futurewei Technologies, Inc., Plano, TX (US)

(72) Inventors: Yu Dong, San Jose, CA (US); Qingqing Zhou, Santa Clara, CA (US); Guogen Zhang, San Jose, CA (US)

(73) Assignee: Futurewei Technologies, Inc., Plano, TX (US)

( * ) Notice: Subject to any disclaimer, the term of this patent is extended or adjusted under 35 U.S.C. 154(b) by 554 days.

(21) Appl. No.: 14/736,050

(22) Filed: Jun. 10, 2015

(65) Prior Publication Data

US 2016/0364484 A1 Dec. 15, 2016

(51) Int. Cl.
| | | |
|---|---|---|
| *G06F 17/30* | (2006.01) | |
| *G06F 16/951* | (2019.01) | |
| *H04L 29/08* | (2006.01) | |
| *G06F 16/27* | (2019.01) | |
| *G06F 16/21* | (2019.01) | |

(52) U.S. Cl.
CPC ......... *G06F 16/951* (2019.01); *G06F 16/217* (2019.01); *G06F 16/27* (2019.01); *H04L 67/1097* (2013.01); *H04L 67/28* (2013.01)

(58) Field of Classification Search
CPC ........................... H04L 47/6215; G06F 16/951
See application file for complete search history.

(56) References Cited

U.S. PATENT DOCUMENTS

| 6,700,869 B1* | 3/2004 | Falco | H04L 47/10 370/230 |
|---|---|---|---|
| 2005/0008011 A1* | 1/2005 | Georgiou | H04L 49/90 370/389 |
| 2005/0108298 A1* | 5/2005 | Iyengar | G06F 17/30215 |
| 2007/0150631 A1* | 6/2007 | Druke | B25J 9/1661 710/244 |
| 2011/0274048 A1 | 11/2011 | Denteneer et al. | |
| 2012/0033590 A1 | 2/2012 | Jazra et al. | |
| 2012/0093159 A1 | 4/2012 | Cornett et al. | |

(Continued)

FOREIGN PATENT DOCUMENTS

CN    102282814 A    12/2011

OTHER PUBLICATIONS

Carney, Don, et al., "Operator Scheduling in a Data Stream Manager," Proceedings of the 29th VLDB Conference, Dec. 2, 2003, 12 pages, Berlin, Germany.

*Primary Examiner* — Usmaan Saeed
*Assistant Examiner* — William P Bartlett
(74) *Attorney, Agent, or Firm* — Slater Matsil, LLP (57) ABSTRACT

Data messages having different priorities may be stored in different communication buffers of a network node. The data messages may then be forwarded from the communication buffers to working buffers as space becomes available in the working buffers. After being forwarded to the working buffers, the data messages may be available to be processed by upper-layer operations of the network node. Priorities may be assigned to the data messages based on a priority level of a query associated with the data messages, a priority level of an upper-layer operation assigned to process the data messages, or combinations thereof.

23 Claims, 5 Drawing Sheets

(56) References Cited

U.S. PATENT DOCUMENTS

| | | | | |
|---|---|---|---|---|
| 2012/0303917 A1* | 11/2012 | Chiu | ............... | G06F 12/02 |
| | | | | 711/165 |
| 2013/0308456 A1* | 11/2013 | Francini | ............ | H04L 47/28 |
| | | | | 370/235 |
| 2014/0074910 A1* | 3/2014 | Tai | ............ | H04L 67/32 |
| | | | | 709/203 |
| 2015/0199415 A1* | 7/2015 | Bourbonnais | ..... | G06F 17/30578 |
| | | | | 707/615 |

* cited by examiner

QUERY PLAN AND OPERATION-AWARE COMMUNICATION BUFFER MANAGEMENT

TECHNICAL FIELD

The present invention relates to a system and method for network communications, and, in particular embodiments, to a system and method for query plan and operation-aware communication buffer management in distributed database systems.

BACKGROUND

A query execution plan may specify a sequence of steps for processing a query. The steps may be performed by upper-layer operations in network nodes of a distributed database system. Some of the steps specified by a query execution plan may require the network nodes to exchange data messages. For example, a step may require a join operation of data tables maintained at different network nodes, and consequently information from some of the tables may be communicated between the network nodes via data messages. Network nodes may maintain buffers for storing and processing data messages. For example, each network node may maintain a communication buffer for storing incoming data messages, as well as multiple working buffers for storing data messages that are being processed, or available to be processed, by upper-layer operations.

SUMMARY OF THE INVENTION

Technical advantages are generally achieved, by embodiments of this disclosure which describe system and method for query plan and operation-aware communication buffer management.

In accordance with an embodiment, a method for buffer management in a distributed database network is provided. In this example, the method comprises receiving data messages at a network node. A query execution plan assigns at least some of the data messages to be processed by different upper-layer query processing operations of the network node, with each of the upper-layer query processing operations being configured to process data stored in a corresponding one of a plurality of working buffers. The method further comprises determining priority levels associated with the data messages based on a priority level of a corresponding upper-layer query processing operation assigned to process the corresponding data messages. The method further comprises buffering the data messages in communication buffers of the network node in accordance with the priority levels associated with the data messages. Data messages having different priority levels are stored in different communication buffers. The data messages stored in the communication buffers are not available to be processed by the upper-layer query processing operations until the data messages are forwarded from the communication buffers to the working buffers. An apparatus for performing this method is also provided.

In accordance with another embodiment, a method for buffer management in a distributed database network is provided. In this example, the method comprises receiving data messages from a network node. At least some of the data messages are associated with different queries. The data messages are assigned to be processed by one or more upper-layer query processing operations of the first network node by one or more query execution plans. Each of the upper-layer processing operations is configured to process data stored in a corresponding one of a plurality of working buffers. The method further comprises determining priority levels associated with the data messages based on priority levels of a query associated with a corresponding one of the data messages, a priority level of an upper-layer query processing operation, or a combination thereof. The method further comprises buffering the data messages in communication buffers of the network node in accordance with the priority levels associated with the data messages. Data messages having different priority levels are stored in different communication buffers. The data messages stored in the communication buffers are not available to be processed by the upper-layer query processing operations until the data messages are forwarded from the communication buffers to the working buffers. An apparatus for performing this method is also provided.

BRIEF DESCRIPTION OF THE DRAWINGS

For a more complete understanding of the present disclosure, and the advantages thereof, reference is now made to the following descriptions taken in conjunction with the accompanying drawings, in which.

Corresponding numerals and symbols in the different figures generally refer to corresponding parts unless otherwise indicated. The figures are drawn to clearly illustrate the relevant aspects of the embodiments and are not necessarily drawn to scale.

DETAILED DESCRIPTION OF ILLUSTRATIVE EMBODIMENTS

The making and using of embodiments of this disclosure are discussed in detail below. It should be appreciated, however, that the concepts disclosed herein can be embodied in a wide variety of specific contexts, and that the specific embodiments discussed herein are merely illustrative and do not serve to limit the scope of the claims. Further, it should be understood that various changes, substitutions and alterations can be made herein without departing from the spirit and scope of this disclosure as defined by the appended claims.

The volume of data message exchanged in a distributed database network may fluctuate significantly over time depending on which processing tasks are being performed. Thus, a communication buffer in a network node may receive high numbers of data messages during some periods. The communication buffer typically operates on a first-infirst-out (FIFO) basis such that data messages are transferred into working buffers in the order in which they are received at the network node. Moreover, the communication buffer may be unable to transfer stored data messages into working buffers that are fully loaded (or otherwise not accepting additional queries). As a result, data messages intended for one working buffer (e.g., a full working buffer) may clog the communication buffer, or otherwise prevent the communication buffer from receiving data message destined for other working buffers (e.g., unfilled or partially filled working buffers). This may cause one or more of the upper-layer operations to sit idle, or otherwise underutilize its processing capacity, which in-turn may reduce the processing efficiency of the entire system and/or increase the time required to complete a processing task. This may be particularly problematic when data messages for a lower-priority operation (e.g. a non-critical operation) prevent the communication buffer receiving data messages for a working buffer associated with a higher-priority operation (e.g., a critical operation). Accordingly, techniques for improving the management of data messages in communication buffers of network nodes are desired to increase the processing efficiency of distributed database networks.

Aspects of this disclosure address the aforementioned problem by storing data messages having different priorities in different communication buffers of a network node. More specifically, a lower-layer buffer management entity in a network node may receive data messages from another network node. Different data messages may be assigned to be processed by different upper-layer operations of the network node. The lower-layer buffer management entity in the network node may determine priority levels associated with the data messages based on either priority levels of a query associated with the data messages, priority levels of upper-layer operations assigned to process the data messages, or a combination thereof.

Notably, if data messages are processed by higher-priority upper-layer operations, the data messages may be assigned to a higher-priority level. In one embodiment, critical upper-layer operations may have a higher-priority level than non-critical upper-layer operations. In such an embodiment, if data messages are processed by the critical upper-layer operations, the data messages may be assigned to the higher-priority level. Accordingly, the lower-layer buffer management entity may buffer the data messages in communication buffers in accordance with the priority levels associated with the data messages. For example, higher-priority data messages may be buffered in a higher-priority communication buffer, while lower-priority data messages may be buffered in a lower-priority communication buffer. Some of the communication buffers may have different storage capacities. For example, a higher-priority communication buffer may have a larger storage capacity than a lower-priority communication buffer. In some instances, a lower-priority communication buffer may become full, while a high-priority communication buffer may still have at least some available space to store additional data messages. In such instances, a lower-layer buffer management entity may refuse to receive additional lower-priority data messages, while continuing to receive and buffer additional higher-priority data messages in the higher-priority communication buffer.

In some embodiments, a lower-layer buffer management entity may send a buffer feedback message to an upstream network node when a storage capacity of a lower-priority communication buffer has been exhausted. When the upstream network node receives the buffer feedback message from a downstream network node, the upstream network node may stop sending lower-priority data messages until a criteria is satisfied. In one embodiment, the upstream network node may resume sending lower-priority data messages when an overflow timer expired. In another embodiment, the upstream network node may resume sending lower-priority data messages when a subsequent buffer feedback message has been received from the downstream network node that instructs the upstream network node to resume sending lower-priority data messages. In other embodiments, the lower-layer buffer management entity may drop additional lower-priority message when a storage capacity of the lower-priority communication buffer has been exhausted.

A lower-layer buffer management entity may dynamically re-allocate at least some storage capacity from a lower-priority communication buffer to a higher-priority communication buffer when an available capacity of the higher-priority communication buffer falls below a threshold. In one embodiment, the lower-layer buffer management entity may dynamically re-allocate at least some storage capacity from the higher-priority communication buffer to the lower-priority communication buffer when an available capacity of the higher-priority communication buffer exceeds a first threshold and an available capacity of the lower-priority communication buffer falls below a second threshold. In addition, the lower-layer buffer management entity may dynamically re-allocate a higher-priority level to data messages associated with the lower-priority level stored in the lower-priority communication buffer, and then re-buffer the data messages in the higher-priority communication buffer when a re-buffering criteria is satisfied. For example, a re-buffering criteria may be satisfied when a number of data messages associated with higher-priority queries and/or assigned to be processed by a higher-priority upper-layer operation falls below a threshold. These and other details are described in greater detail below.

Figure 1:
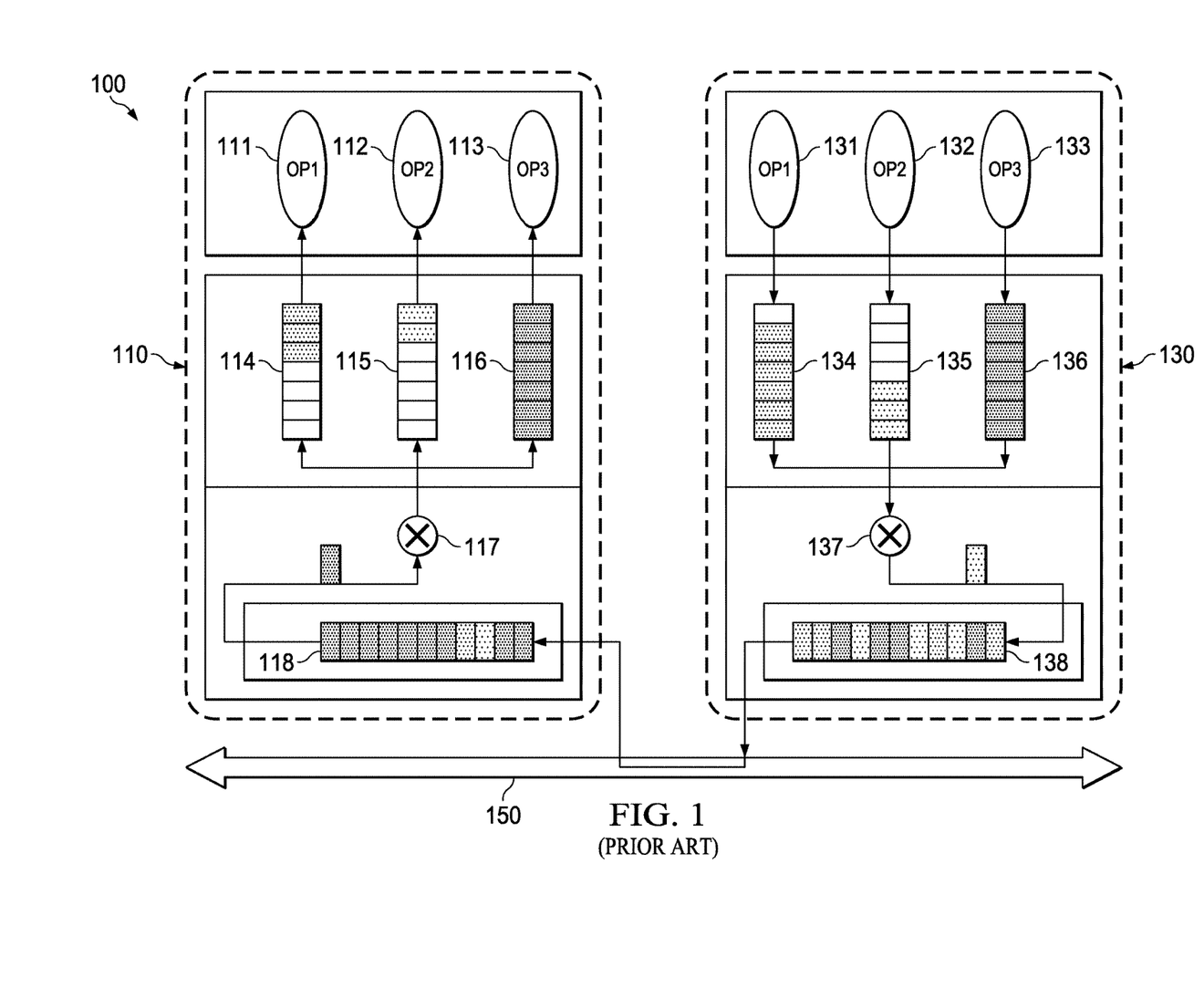
FIG. 1 illustrates a diagram of a conventional distributed database network.

FIG. 1 illustrates a diagram of a conventional distributed database network 100. As shown, the conventional distributed database network 100 comprises a downstream network node 110 and an upstream network node 130 that are connected through a network connection 150. The downstream network node 110 comprises upper-layer operations 111, 112, 113, working buffers 114, 115, 116, a lower-layer buffer management entity 117, and a communication buffer 118. Similarly, the upstream network node 130 comprises upper-layer operations 131, 132, 133, working buffers 134, 135, 136, a lower-layer buffer management entity 137, and a communication buffer 138. The upper-layer operations 131, 132, 133 in the upstream network node 130 generate data messages. The upper-layer operation 131 may be a higher-priority and/or a critical operation, while the upper-layer operations 132, 133 may be a lower-priority and/or non-critical operations. The data messages that are generated from the upper-layer operations 131, 132, 133 are then stored into working buffers 134, 135, 136 that are dedicated to each of the upper-layer operations 131, 132, 133, respectively. The lower-layer buffer management entity 137 forwards the data message from the working buffers 134, 135, 136 to the communication buffer 138. The communication buffer 138 stores the data messages receiving from the working buffers 134, 135, 136. The downstream network node 110 receives data messages from the upstream network node 130, and stores the data messages into the communication buffer 118. The lower-layer buffer management entity 117 then forwards the data messages based on which of the upper-layer operations 111, 112, 113 assigned to process the respective data messages to the corresponding working buffers 114, 115, 116. The working buffers 114, 115, 116 forward the data messages to the upper-layer operations 111, 112, 113.

Notably, the communication buffer 118 stores data messages for each of the upper-layer operations 111, 112, 113, and the upper-layer operations 111, 112, 113 may be unable to process/access data messages stored in the communication buffer 118 until those data messages are forwarded to the working buffers 114, 115, 116. The communication buffer 118 may operate on a first-in-first-out (FIFO) basis. Consequently, data messages assigned to one upper-layer operation (e.g., the upper-layer operation 113) may clog the communication buffer 118 when a corresponding working buffer (e.g., the working buffer 116) is full. This may prevent data messages from reaching other working buffers (e.g., the working buffers 114, 115), which in-turn may cause some upper-layer operations to sit idle or otherwise operate at reduced efficiency.

Aspects of this disclosure address this problem by storing data messages in different communication buffers based on priority levels of the data messages. The data messages may be assigned a priority level based on a query associated with the data messages and/or an upper-layer operations assigned to process the data message.

Figure 2:
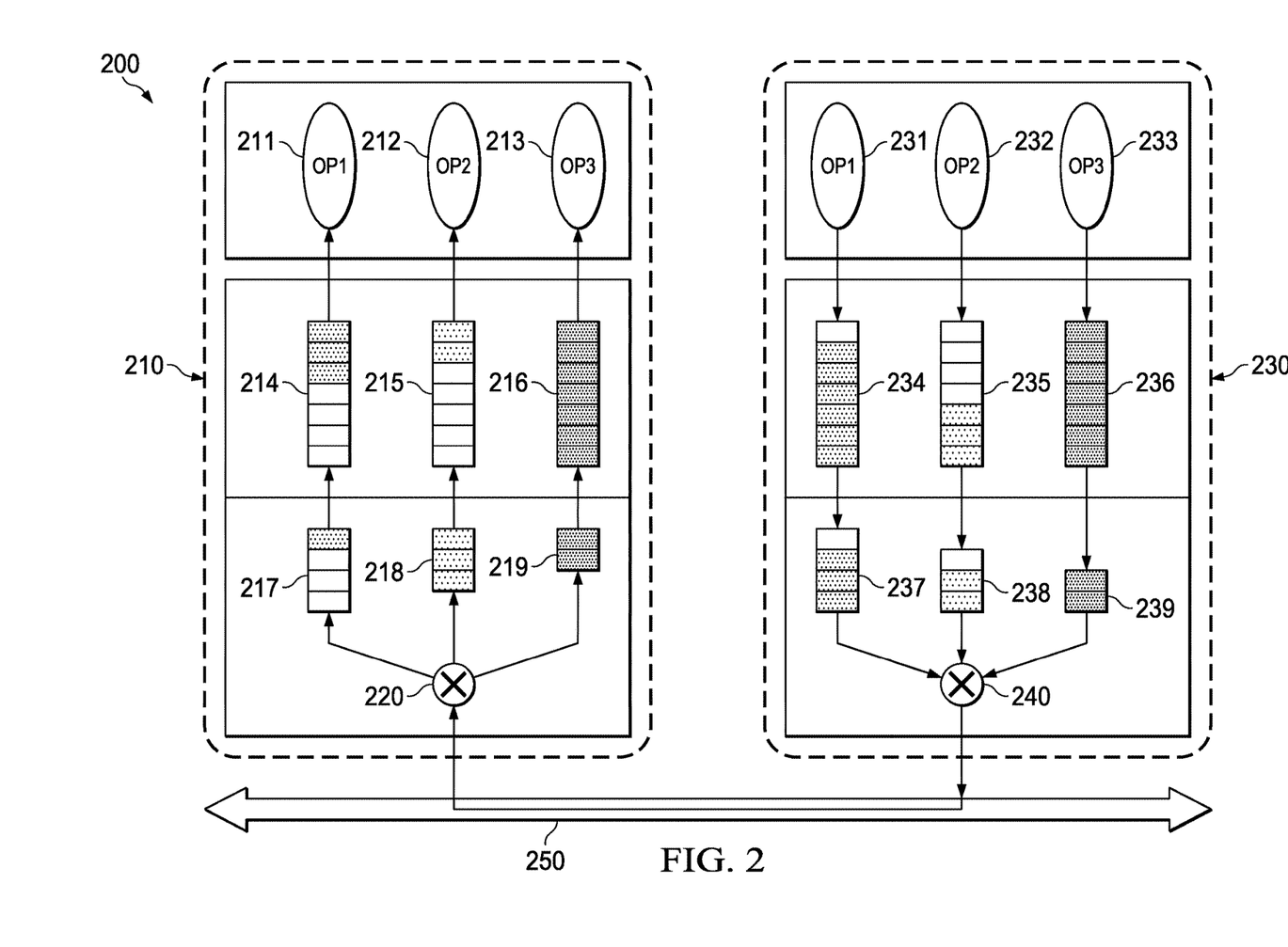
FIG. 2 illustrates a diagram of an embodiment distributed database network.

FIG. 2 illustrates a diagram of an embodiment distributed database network 200. As shown, the distributed database network 200 comprises a downstream network node 210 and an upstream network node 230 that are connected through a network connection 250. The downstream network node 210 comprises a higher-priority upper-layer operation (e.g., a critical operation) 211, lower-priority upper-layer operations (e.g., non-critical operations) 212, 213, working buffers 214, 215, 216, a higher-priority communication buffer 217, lower-priority communication buffers 218, 219, and a lower-layer buffer management entity 220. Similarly, the upstream network node 230 comprises a higher-priority upper-layer operation 231, lower-priority upper-layer operations 232, 233, working buffers 234, 235, 236, a higher-priority communication buffer 237, lower-priority communication buffers 238, 239, and a lower-layer buffer management entity 240. The upper-layer operations 231, 232, 233 in the upstream network node 230 generate data messages associated with priority levels of the upper-layer operations. The higher-priority upper-layer operation 231 generates data messages associated with a higher-priority level, while the lower-priority upper-layer operations 232, 233 generate data messages associated with a lower-priority level. The data messages generated from the higher-priority upper-layer operation 231 are stored into the working buffer 234, and then forwarded to the higher-priority communication buffer 237. While the data messages generated form the lower-priority upper-layer operation 232, 232 are stored into the working buffers 235, 236, and then forwarded to the lower-priority communication buffers 238, 239. The lower-layer buffer management entity 240 serves the communication buffers 237, 238, 239 to transmit the data messages to the downstream network node 210 through the network connection 250. When the upstream network node 230 receives a buffer feedback message from the downstream network node 210, the upstream network node 230 stops sending lower-priority data messages until a criteria is satisfied. The upstream network node 230 resumes sending lower-priority data messages when an overflow timer expired. In one embodiment, the upstream network node 230 resumes sending lower-priority data messages when a subsequent buffer feedback message has been received from the downstream network node 210 that instructs the upstream network node 230 to resume sending lower-priority data messages.

When the downstream network node 210 receives the data messages from the upstream network node 230, the lower-layer buffer management entity 220 determines priority levels associated with each of the data message based on a priority level of a corresponding upper-layer query processing operation assigned to process the corresponding data messages, a priority level of a query associated with the corresponding data messages or a combination thereof. In one embodiment, data messages assigned to be processed by higher-priority upper-layer operations are associated with a higher-priority level than data messages assigned to be processed by lower-priority upper-layer operations. In another embodiment, data messages associated with higher-priority queries are assigned. The lower-layer buffer management entity 220 buffers the data messages in the communication buffers 217, 218, 219 in accordance with the priority levels associated with the data messages. For example, data messages associated with a higher-priority level are buffered in the communication buffer 217, while data messages associated with lower-priority levels are buffered in the communication buffers 218, 219. The data messages stored in the communication buffers 217, 218, 219 are not available to be processed by the upper-layer operations 211, 212, 213 until the data messages are forwarded from the communication buffers 217, 218, 219 to the working buffers 214, 215, 216. In some embodiments, a higher-priority communication buffer (e.g., the communication buffer 217) has a larger storage capacity than at least one lower-priority communication buffer (e.g., one of the communication buffers 218, 219). In some instances, a lower-priority communication buffer (e.g., one of the communication buffers 218, 219) may become full, while a higher-priority communication buffer (e.g., the communication buffer 217) has available capacity for storing additional data messages. The lower-layer buffer management entity 220 may refuse to buffer any additional lower-priority data messages received during a period when a storage capacity of the lower-priority communication buffers (e.g., one or both of the communication buffers 218, 219) is exhausted, while still continuing to receive and buffer additional higher-priority data messages in the higher-priority communication buffer (e.g., the communication buffer 217). In such instances, the lower-layer buffer management entity 220 may drop the additional lower-priority data messages received during the period without buffering the lower-priority data messages in the lower-priority communication buffers 218, 219. The lower-layer buffer management entity 220 may also send a buffer feedback message to the upstream network node 230 that instructs the upstream network node 230 to stop sending lower-priority data messages. In other instances, the upstream network node 230 receives a buffer feedback message that instructs the upstream network node 230 to stop sending higher-priority data messages. The lower-layer buffer management entity 220 may dynamically re-allocate some storage capacity from the one or more lower-priority communication buffers 218, 219 to the higher-priority communication buffer 217 when an available storage capacity of the higher-priority communication buffer 217 falls below a threshold. In an embodiment, the lower-layer buffer management entity 220 dynamically re-allocates some storage capacity from the higher-priority communication buffer 217 to the one or more lower-priority communication buffers 218, 219 when an available storage capacity of the higher-priority communication buffer 217 exceeds a first threshold and/or an available storage capacity of the lower-priority communication buffers 218, 219 falls below a second threshold.

The lower-layer buffer management entity 220 may determine priority levels associated with the data messages based on priority levels of a query associated with a corresponding one of the data messages, priority levels of an upper-layer query processing operations, or a combination thereof. In one embodiment, the priority levels of the data messages are configured based on a combination of priority levels of the queries and priority levels of the upper-layer operations. For example, when a data message is associated with a higher-priority query and assigned to be processed by the higher-priority upper-layer operation 211, the data message may be assigned a higher-priority level and buffered in the higher-priority communication buffer 217. When a data message is associated with a higher-priority query and assigned to be processed by a lower-priority upper-layer operation, the data message may be assigned a lower-priority level and initially buffered in a lower-priority communication buffer (e.g., the communication buffers 218, 219). In such an instance, the lower-layer buffer management entity 220 may dynamically re-assign a higher-priority level to the data message when a re-buffering criteria is satisfied, and then re-buffer the data message in a higher-priority communication buffer (e.g., the communication buffer 217). In one embodiment, the re-buffering criteria is satisfied when an operation is promoted from a lower-priority classification to a higher-priority classification. For example, data messages associated with a higher-priority query may be assigned to be processed by either a first operation or a second operation. The first operation may have a higher-priority than the second operation, and consequently, the data messages assigned to the first operation may be initially stored in a higher-priority communication buffer, while data messages assigned to the second operation may be initially stored in a lower-priority communication buffer. As time passes, at least some of the data messages assigned to the first operation may be forwarded from the higher-priority communication buffer to a corresponding working buffer. A re-buffering criteria may be satisfied once the higher-priority communication buffer stores fewer than a threshold number of data messages assigned to the first operation (e.g., the threshold being greater than or equal to zero), at which point the second operation may be re-classified as a higher-priority application, and at least some data messages assigned to the second operation may be re-buffered in the higher-priority communication buffer.

Figure 3:
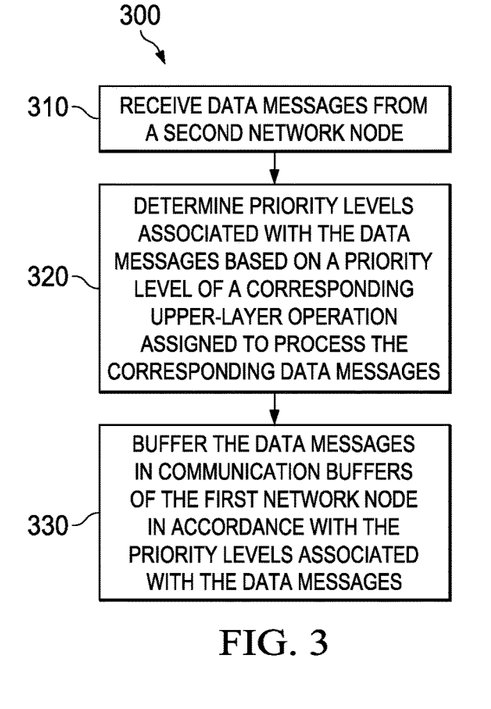
FIG. 3 illustrates a flowchart of an embodiment method for communication buffer management in a distributed database network.

FIG. 3 illustrates a flowchart of an embodiment method 300 for communication buffer management in a distributed database network, as might be performed by a lower-layer buffer management entity in a downstream network node. As shown, the method 300 begins at step 310, where the downstream network node receives data messages from an upstream network node. A query execution plan may assign the data messages to be processed by different upper-layer operations. Subsequently, the method 300 proceeds to step 320, where the lower-layer buffer management entity determines priority levels associated with the data messages based on a priority level of a corresponding upper-layer operation assigned to process the corresponding data messages. In one example, data messages assigned to be processed by higher-priority upper-layer operations (e.g., critical operations) are associated with a higher-priority level than data messages assigned to be processed by lower-priority upper-layer operations (e.g., non-critical operations). Finally, the method 300 proceeds to step 330, where the lower-layer buffer management entity buffers the data messages in communication buffers of the downstream network node in accordance with the priority levels associated with the data messages. The data messages having different priority levels are stored in different communication buffers. Accordingly, the lower-layer buffer management entity buffers higher-priority data message in a higher-priority communication buffer and lower-priority data message in a lower-priority communication buffer. In one embodiment, a higher-priority communication buffer has a larger storage capacity than a lower-priority communication buffer.

Figure 4:
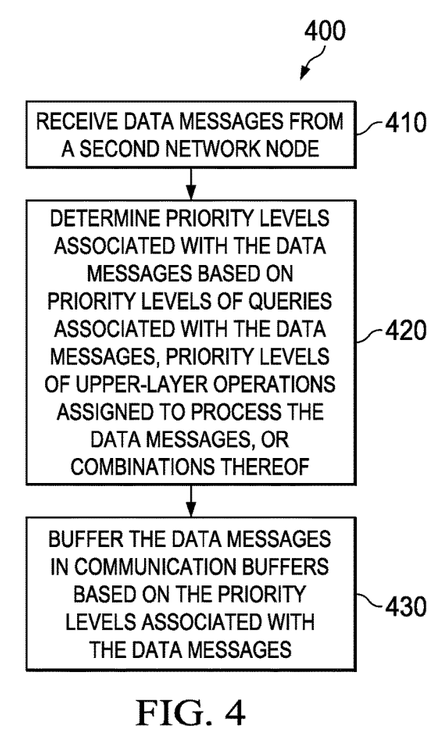
FIG. 4 illustrates a flowchart of another embodiment method for communication buffer management in a distributed database network.

FIG. 4 illustrates a flowchart of another embodiment method 400 for communication buffer management in a distributed database network, as might be performed by a lower-layer buffer management entity in a downstream network node. As shown, the method 400 begins at step 410, where the lower-layer buffer management entity receives data messages from an upstream network node. The data messages are associated with different queries and assigned to be processed by one or more upper-layer operations of the downstream network node by one or more query execution plans. In addition, each of the upper-layer operations is configured to process data stored in a corresponding one of a plurality of working buffers. Subsequently, the method 400 proceeds to step 420, where the lower-layer buffer management entity determines priority levels associated with the data messages based on priority levels of the corresponding queries, priority levels of the upper-layer operations, or a combination thereof. Finally, the method 400 proceeds to step 430, where the lower-layer buffer management entity buffers the data messages in communication buffers of the downstream network node in accordance with the priority levels associated with the data messages stored in different communication buffers that have different priority levels.

In some embodiments, the lower-layer buffer management entity determines that a data message is associated with a higher-priority level when the data message is associated with a higher-priority query and assigned to be processed by a higher-priority upper-layer operation. The data message is then buffered in a higher-priority communication buffer of the downstream network node. Additionally, the lower-layer buffer management entity may determine that a data message is associated a lower priority level when the data message is associated with a higher-priority query and assigned to be processed by a lower-priority upper-layer operation. In this instance, the data message is initially buffered in the lower-priority communication buffer of the downstream network node. The lower-layer buffer management entity may dynamically re-assign a higher-priority level to the data message stored in the lower-priority communication buffer when a re-buffering criteria is satisfied e.g., when a number of data messages associated with the higher-priority query and assigned to be processed by the higher-priority upper-layer operation falls below a threshold. The lower-priority data message is re-buffered in the higher-priority communication buffer after being re-assigned the higher-priority level.

Figure 5:
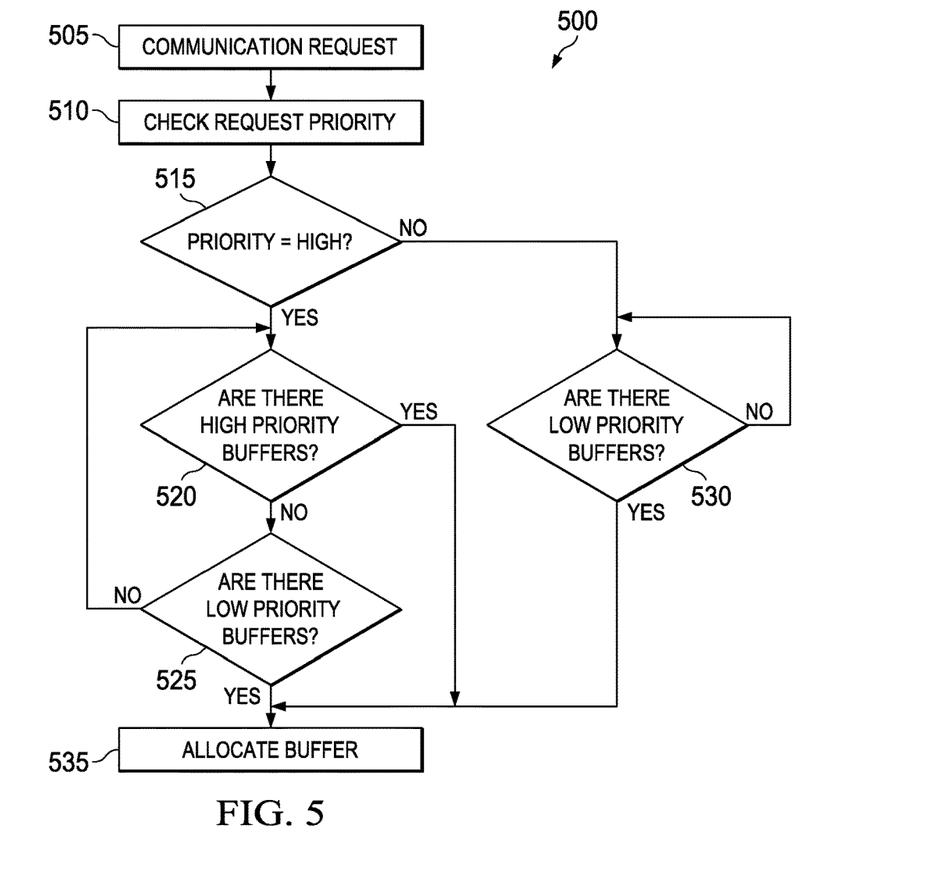
FIG. 5 illustrates a flowchart of an embodiment method for communication buffer management.

FIG. 5 illustrates a flowchart of an embodiment method 500 for communication buffer management. The method 500 begins at step 505, where a downstream network node receives a communication request from an upstream network node. Subsequently, the method 500 proceeds to step 510, where a lower-layer buffer management entity checks a priority level associated with the communication request. Subsequently, the method 500 proceeds to step 515, where the lower-layer buffer management entity determines a priority level associated with the communication request (e.g., upper-layer operation). If the lower-layer buffer management entity determines that the priority level associated with the communication request is a higher priority level, then the method 500 proceeds to step 520, where the lower-layer buffer management entity determines whether a storage capacity (e.g., quota) of a higher-priority communication buffer is available. If so, the method 500 proceeds to step 535, where the lower-layer buffer management entity buffers the communication request in the higher-priority communication buffer. During step 520, if the lower-layer buffer management entity determines that a storage capacity of the higher-priority communication buffer is not available, the method 500 proceeds to step 525, where the lower-layer buffer management entity determines whether a storage capacity of a lower-priority communication buffer is available. If so, the method 500 proceeds to step 535, where the lower-layer buffer management entity buffers the communication request in the lower-priority communication buffer. During step 525, if the lower-layer buffer management entity determines that a storage capacity of the lower-priority communication buffer is not available, the method 500 proceeds to step 520. During step 515, if the lower-layer buffer management entity determines the priority level associated with the communication request is a lower-priority level, then the method 500 proceeds to step 530, where the lower-layer buffer management entity determines whether a storage capacity of the lower-priority communication buffer is available. If so, the method 500 proceeds to step 535, where the lower-layer buffer management entity buffers the communication request in the lower-priority communication buffer. Alternatively, if the lower-layer buffer management entity determines that a storage capacity of the lower-priority communication buffer is not available, the method 500 proceeds to step 530. A pseudo-code for the communication buffer management method as shown in FIG. 5 is provided in Table 1.

TABLE 1

IF communication request comes THEN
    Check priority of query operation associated with request;
    IF high priority operation THEN
        IF available high-priority quota > 0 THEN
            Allocate buffer;
            High-priority quota decrease by 1;
        ELSE IF available low-priority quota > 0 THEN
            Allocate buffer;
            Low-priority quota decrease by 1;
        ELSE
            Wait for available quota;
    ELSE IF low priority operation THEN
        IF available low-priority quota > 0 THEN
            Allocate buffer;
            Low-priority quota decrease by 1;
        ELSE
            Wait for available quota;
IF data are pulled to working buffer by query operation THEN
    Increase quota for its priority;

A communication layer may determine a priority level of a communication request in accordance with a query execution plan and an operation before buffering the communication request. A tuple <QUERYNO, PLANNO> scheme may be used to determine a priority level of a communication request. In a conventional distributed database system (e.g., massively parallel processing (MPP) database), each of query identified by QUERYNO may have a priority level determined by a database workload manager. In such an instance, a communication buffer management entity may use the priority level associated with the query to determine whether the query is a critical operation. If the query is a critical operation, the communication request may be determined as a higher-priority level using a plan execution sequence identified by a PLANNO. Conversely, if a query is a non-critical operation, the communication request may be determined as a lower-priority level using the plan execution sequence identified by the PLANNO. Accordingly, the higher-priority query may be handled earlier than the lower-priority query. However, the PLANNO may not always indicate an actual execution sequence order in nested query operations. For example, a nested hash join in a nested query operations may include a build phase (e.g., higher-priority level), a probe phase (e.g., lower-priority level), or a combination thereof.

Figure 6:
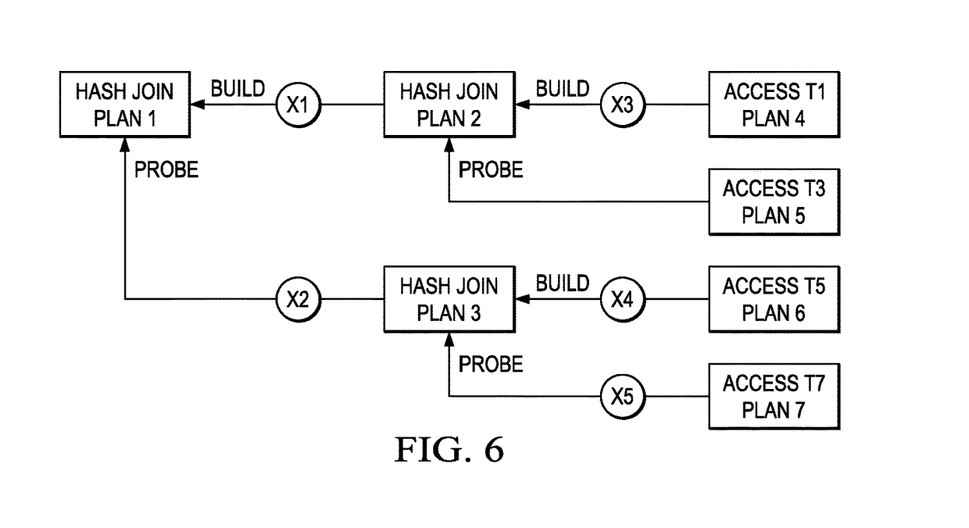
FIG. 6 illustrates a diagram of an embodiment method for hash join in a distributed database network.

FIG. 6 illustrates a diagram of an embodiment method for hash join in a distributed database network. As shown, a hash join in a Plan 1 is the topmost operation. The hash join in the Plan 1 exchanges data with other network nodes for a build phase from a Plan 2 and a probe phase from a Plan 3. An X1 and an X2 may stand for the data exchanges with other network nodes in each phase (e.g., build phase, probe phase). The hash join in the Plan 1 may not be completed until the build phase depending on the Plan 2 and the probe phase depending on Plan 3 are completed. Similarly, the Plan 2 may be not completed until a build phase depending on a Plan 4 and a probe phase depending on a Plan 5 are completed. A data exchange X3 may be performed using the build phase, but the probe phase may not exchange data. Similarly, a data exchange X4 may be performed using a build phase depending on a Plan 6 and a data exchange X5 may be performed using a probe phase depending on a Plan 7.

In such instances, a binary tree-like data structure may be used to maintain dependencies among operations and data exchanges. For example, a tree structure may be built in the Plan 1 that may be a root node. The build phase depending on the Plan 2 may be a right child node and the probe phase depending on the Plan 3 may be a left child node, respectively. The right-most node may be the Plan 4 and the data exchange may be marked on the corresponding node (e.g., X1 is marked on the node of the Plan 2, X2 is marked on the node of the Plan 3). Accordingly, the right-most node Plan 4 may be associated with the X3 and may have a data exchange with other network nodes. In addition, the Plan 4 may be removed from the tree if the Plan 4 may not exchange data associate with other network nodes. For example, when a communication request is generated, a PLANNO associated with the communication request may be checked. If the communication request is determined as the right-most node of the tree, a higher-priority level may be allocated to the communication request. If the communication request is not determined as the right-most node of the tree, a lower-priority level may be allocated to the communication request. Based on the rule aforementioned, the right-most node may be removed from the tree if there is no data exchange marked with a plan node. In addition, one or more plan nodes may be removed from the tree by the rule. For example, the data exchange X3 may be completed while removing the Plan 4, and then a Plan 5 may become the right-most node subsequently. Accordingly, if there is no data exchange marked on the Plan 5, it may also be removed from the tree. As a result, the Plan 2 may become the right-most node and the X1 may be a successor to a higher-priority level for the communication request. An algorithm to check a priority level in the binary-tree like data structure is provided in Table 2.

TABLE 2

```
Check_Request_Priority(PLANNO, TREE){
    IF PLANNO is right most node of TREE{
        RETURN high_priority;
    }ELSE{
        RETURN low_priority;
    }
}
```

Figure 7:
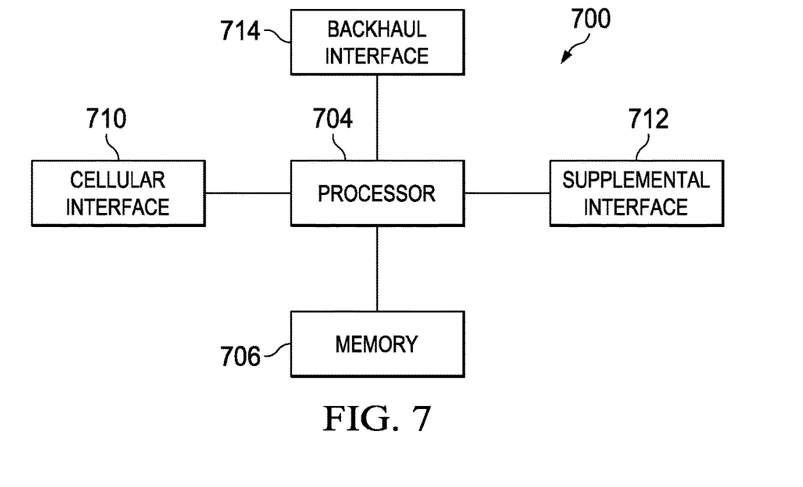
FIG. 7 illustrates a diagram of an embodiment communications device.

FIG. 7 illustrates a block diagram of an embodiment of a communications device 700, which may be equivalent to one or more devices (e.g., requesting devices, candidate devices, network nodes, etc.) discussed above. The communications device 700 may include a processor 704, a memory 706, a cellular interface 710, a supplemental interface 712, and a backhaul interface 714, which may (or may not) be arranged as shown in FIG. 7. The processor 704 may be any component capable of performing computations and/or other processing related tasks, and the memory 706 may be any component capable of storing programming and/or instructions for the processor 704. The cellular interface 710 may be any component or collection of components that allows the communications device 700 to communicate using a cellular signal, and may be used to receive and/or transmit information over a cellular connection of a cellular network. The supplemental interface 712 may be any component or collection of components that allows the communications device 700 to communicate data or control information via a supplemental protocol. For instance, the supplemental interface 712 may be a non-cellular wireless interface for communicating in accordance with a Wireless-Fidelity (Wi-Fi) or Bluetooth protocol. Alternatively, the supplemental interface 712 may be a wireline interface. The backhaul interface 714 may be optionally included in the communications device 700, and may comprise any component or collection of components that allows the communications device 700 to communicate with another device via a backhaul network.

Figure 8:
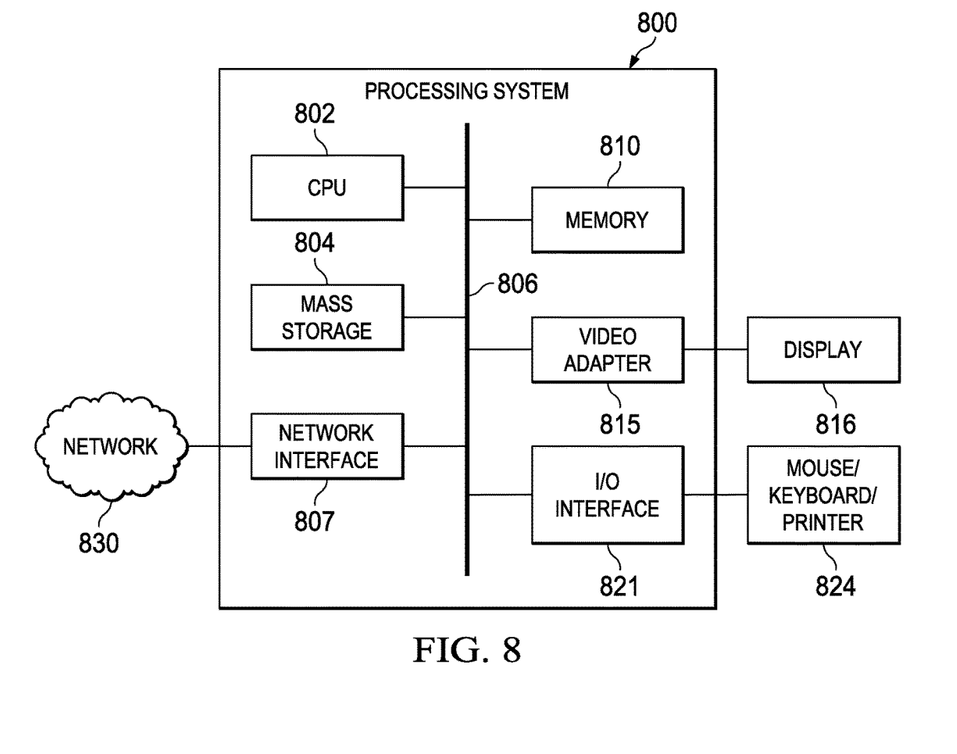
FIG. 8 illustrates a diagram of an embodiment computing platform.

FIG. 8 is a block diagram of a processing system 800 that may be used for implementing the devices and methods disclosed herein. Specific devices may utilize all of the components shown, or only a subset of the components, and levels of integration may vary from device to device. Furthermore, a device may contain multiple instances of a component, such as multiple processing units, processors, memories, transmitters, receivers, etc. The processing system 800 may comprise a processing unit equipped with one or more input/output devices 816, 824, such as a speaker, microphone, mouse, touchscreen, keypad, keyboard, printer, display, and the like. The processing system 800 may include a central processing unit (CPU) 802, memory 810, a mass storage device 804, a video adapter 815, and an I/O interface 821, all connected to a bus 806.

The bus 806 may be one or more of any type of several bus architectures including a memory bus or memory controller, a peripheral bus, video bus, or the like. The CPU 802 may comprise any type of electronic data processor. The memory 810 may comprise any type of non-transitory system memory such as static random access memory (SRAM), dynamic random access memory (DRAM), synchronous DRAM (SDRAM), read-only memory (ROM), a combination thereof, or the like. In an embodiment, the memory 810 may include ROM for use at boot-up, and DRAM for program and data storage for use while executing programs.

The mass storage device 804 may comprise any type of non-transitory storage device configured to store data, programs, and other information and to make the data, programs, and other information accessible via the bus 806. The mass storage device 804 may comprise, for example, one or more of a solid state drive, hard disk drive, a magnetic disk drive, an optical disk drive, or the like.

The video adapter 815 and the I/O interface 821 provide interfaces to couple external input and output devices to the processing system 800. As illustrated, examples of input and output devices include the display 816 coupled to the video adapter 815 and the mouse/keyboard/printer 824 coupled to the I/O interface 821. Other devices may be coupled to the processing system 800, and additional or fewer interfaces or interface cards may be utilized. For example, a serial interface such as Universal Serial Bus (USB) (not shown) may be used to provide an interface for a printer 824.

The processing system 800 also includes one or more network interfaces 807, which may comprise wired links, such as an Ethernet cable or the like, and/or wireless links to access nodes or different networks 830. The network interface 807 allows the processing system 800 to communicate with remote units via the networks 830. For example, the network interface 807 may provide wireless communication via one or more transmitters/transmit antennas and one or more receivers/receive antennas. In an embodiment, the processing system 800 is coupled to a local-area network 830 or a wide-area network 830 for data processing and communications with remote devices, such as other processing units, the Internet, remote storage facilities, or the like.

While this invention has been described with reference to illustrative embodiments, this description is not intended to be construed in a limiting sense. Various modifications and combinations of the illustrative embodiments, as well as other embodiments of the invention, will be apparent to persons skilled in the art upon reference to the description. It is therefore intended that the appended claims encompass any such modifications or embodiments.

What is claimed is:

1. A method for buffer management in a distributed database network, the method comprising:
receiving, by a lower-layer buffer management entity in a first network node, data messages corresponding to a single query from a second network node, wherein a query execution plan assigns at least some of the data messages to be processed by different upper-layer query processing operations of the first network node, and wherein each of the upper-layer query processing operations is configured to process data stored in a corresponding one of a plurality of working buffers;
buffering the data messages in communication buffers of the first network node in accordance with priority levels of upper-layer query processing operations assigned to process the corresponding data messages, wherein data messages that are assigned to be processed by upper-layer query processing operations having different priority levels are stored in different communication buffers; and
forwarding the data messages from each of the communication buffers to a corresponding one of the working buffers on a first-in-first-out basis such that the data messages are forwarded from a given communication buffer in the same order in which they were placed in the given communication buffer, wherein the data messages stored in the communication buffers are not available to be processed by the upper-layer query processing operations until the data messages are forwarded from the communication buffers to the plurality of working buffers.

2. The method of claim 1, wherein at least some of the communication buffers have different storage capacities.

3. The method of claim 2, wherein the communication buffers include at least one higher-priority communication buffer having a larger storage capacity than at least one lower-priority communication buffer.

4. The method of claim 1, wherein critical upper-layer query processing operations have a higher-priority level than non-critical upper-layer operations.

5. The method of claim 1, wherein buffering the data messages in the communication buffers in accordance with the priority levels associated with the data messages comprises:
buffering data messages assigned to be processed by higher-priority upper-layer query processing operations in a first communication buffer; and
buffering data messages assigned to be processed by lower-priority upper-layer query processing operations in a second communication buffer.

6. The method of claim 5, further comprising:
refusing, by the lower-layer buffer management entity, to buffer any additional data messages assigned to be processed by the lower-priority upper-layer query processing operations during a period when a storage capacity of the second communication buffer is exhausted; and
continuing to receive and buffer additional data messages assigned to be processed by the higher-priority upper-layer query processing operations in the first communication buffer during the period when the storage capacity of the second communication buffer is exhausted.

7. The method of claim 6, wherein refusing to buffer any additional data messages assigned to be processed by the lower-priority upper-layer query processing operations during the period when the storage capacity of the second communication buffer is exhausted comprises dropping the additional data messages assigned to be processed by the lower-priority upper-layer query processing operations without buffering the data messages assigned to be processed by the lower-priority upper-layer query processing operations in the second communication buffer.

8. The method of claim 6, wherein refusing to buffer any additional data messages assigned to be processed by the lower-priority upper-layer query processing operations during the period when the storage capacity of the second communication buffer is exhausted comprises sending a buffer feedback message to at least the second network node, the buffer feedback message instructing the second network node to stop sending data messages assigned to be processed by the lower-priority upper-layer query processing operations until a criteria is satisfied.

9. The method of claim 8, wherein the criteria is satisfied upon expiration of an overflow timer.

10. The method of claim 8, wherein the criteria is satisfied when a subsequent buffer feedback message is received that instructs the second network node to resume sending data messages assigned to be processed by the lower-priority upper-layer query processing operations.

11. The method of claim 5, further comprising:
dynamically re-allocating at least some storage capacity from the second communication buffer to the first communication buffer when an available storage capacity of the first communication buffer falls below a threshold.

12. The method of claim 5, further comprising:
dynamically re-allocating at least some storage capacity from the first communication buffer to the second communication buffer when an available storage capacity of the first communication buffer exceeds a first threshold and an available storage capacity of the second communication buffer falls below a second threshold.

13. A method for buffer management in a distributed database network, the method comprising:
receiving, by a lower-layer buffer management entity in a first network node, data messages from a second network node, wherein at least some of the data messages are associated with different queries, wherein the data messages are assigned to be processed by one or more upper-layer query processing operations of the first network node by one or more query execution plans, and wherein each of the upper-layer query processing operations is configured to process data stored in a corresponding one of a plurality of working buffers;
buffering the data messages in communication buffers of the first network node in accordance with a combination of priority levels of the upper-layer query processing operations assigned to process the data messages and priority levels of the queries associated with the data messages; and
forwarding the data messages from each of the communication buffers to a corresponding one of the working buffers on a first-in-first-out basis such that the data messages are forwarded from a given communication buffer in the same order in which they were placed into the given communication buffer, wherein the data messages stored in the communication buffers are not available to be processed by the upper-layer query processing operations until the data messages are forwarded from the communication buffers to the plurality of working buffers.

14. The method of claim 13, wherein at least some of the communication buffers have different storage capacities.

15. The method of claim 14, wherein the communication buffers include at least one higher-priority communication buffer having a larger storage capacity than at least one lower-priority communication buffer.

16. The method of claim 13, wherein buffering the data messages associated with different queries in the communication buffers in accordance with the priority levels associated with the data messages comprises:
buffering messages associated with higher-priority queries in a first communication buffer; and
buffering messages associated with lower-priority queries in a second communication buffer.

17. The method of claim 16, further comprising:
dynamically re-allocating at least some storage capacity from the second communication buffer to the first communication buffer when an available storage capacity of the first communication buffer falls below a threshold.

18. A first network node comprising: a processor; and
a non-transitory computer readable storage medium storing programming for execution by the processor, the programming including instructions to:
receive, by a lower-layer buffer management entity in the first network node, data messages corresponding to a single query from a second network node, wherein a query execution plan assigns at least some of the data messages to be processed by different upper-layer query processing operations of the first network node, and wherein each of the upper-layer query processing operations is configured to process data stored in a corresponding one of a plurality of working buffers;

buffer the data messages in communication buffers of the first network node in accordance with priority levels of upper-layer query processing operation assigned to process the corresponding data messages, wherein data messages that are assigned to be processed by upper-layer query processing operations having different priority levels are stored in different communication buffers; and forward the data messages from each of the communication buffers to a corresponding one of the working buffers on a first-in-first-out basis such that the data messages are forwarded from a given communication buffer in the same order in which they were placed in the given communication buffer, wherein the data messages stored in the communication buffers are not available to be processed by the upper-layer query processing operations until the data messages are forwarded from the communication buffers to the plurality of working buffers.

19. The first network node of claim 18, wherein at least some of the communication buffers have different storage capacities.

20. The first network node of claim 19, wherein the communication buffers include at least one higher-priority communication buffer having a larger storage capacity than at least one lower-priority communication buffer.

21. The first network node of claim 18, wherein critical upper-layer query processing operations have a higher-priority level than non-critical upper-layer operations.

22. The first network node of claim 18, wherein the instructions to buffer the data messages in the communication buffers in accordance with the priority levels associated with the data messages includes instructions to:

buffer data messages assigned to be processed by higher-priority upper-layer query processing operations in a first communication buffer; and buffer data messages assigned to be processed by lower-priority upper-layer query processing operations in a second communication buffer.

23. The first network node of claim 22, further comprising: dynamically re-allocating at least some storage capacity from the second communication buffer to the first communication buffer when an available storage capacity of the first communication buffer falls below a threshold.

* * * * *